United States Patent
Yun et al.

(10) Patent No.: US 9,207,067 B2
(45) Date of Patent: Dec. 8, 2015

(54) POSITION DETECTING APPARATUS AND METHOD FOR CONTROLLING THE SAME

(71) Applicant: SAMSUNG ELECTRONICS CO., LTD., Suwon-si, Gyeonggi-do (KR)

(72) Inventors: Jae-mu Yun, Hwaseong-si (KR); Jin-gi Lee, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 13/911,445

(22) Filed: Jun. 6, 2013

(65) Prior Publication Data

US 2014/0110563 A1 Apr. 24, 2014

(30) Foreign Application Priority Data

Oct. 19, 2012 (KR) .......................... 10-2012-0116895

(51) Int. Cl.
*G01B 11/14* (2006.01)

(52) U.S. Cl.
CPC ...................................... *G01B 11/14* (2013.01)

(58) Field of Classification Search
CPC ........ G01B 11/14; G01B 11/26; G01D 5/473; G01D 5/34
USPC ................. 250/206.1, 206.2, 231.13, 231.16, 250/231.18, 234, 237 G, 237 R, 239; 356/614–616; 359/694–697
See application file for complete search history.

(56) References Cited

U.S. PATENT DOCUMENTS

| | | | |
|---|---|---|---|
| 7,403,295 B2 | 7/2008 | Seo | |
| 7,755,743 B2 | 7/2010 | Kumahara et al. | |
| 2010/0271711 A1* | 10/2010 | Yoshida et al. | ............... 359/694 |

FOREIGN PATENT DOCUMENTS

| | | |
|---|---|---|
| JP | 2012-103376 A | 5/2012 |
| KR | 10-2010-0007489 A | 1/2010 |
| KR | 10-2012-0016322 A | 2/2012 |

* cited by examiner

*Primary Examiner* — Pascal M Bui Pho
*Assistant Examiner* — Don Williams
(74) *Attorney, Agent, or Firm* — Drinker Biddle & Reath LLP

(57) ABSTRACT

A position detecting apparatus includes: a driver that moves a moving body having a lens mounted thereon, a first sensor and a second sensor respectively mounted on the moving body, a displacement detection pattern unit that reflects light emitted by the first or second sensors, and a controller that controls the first sensor and the second sensor to be alternately turned on to emit light, and if the light reflected by the displacement detection pattern unit is sensed, the controller detects a position of the lens based on sensing results, where the controller determines a period in which the first sensor is turned on and a period in which the second sensor is turned on based on an intersection point of a signal waveform sensed by the first sensor and a signal waveform sensed by the second sensor. Accordingly, power consumption of the position detecting apparatus can be reduced.

10 Claims, 6 Drawing Sheets

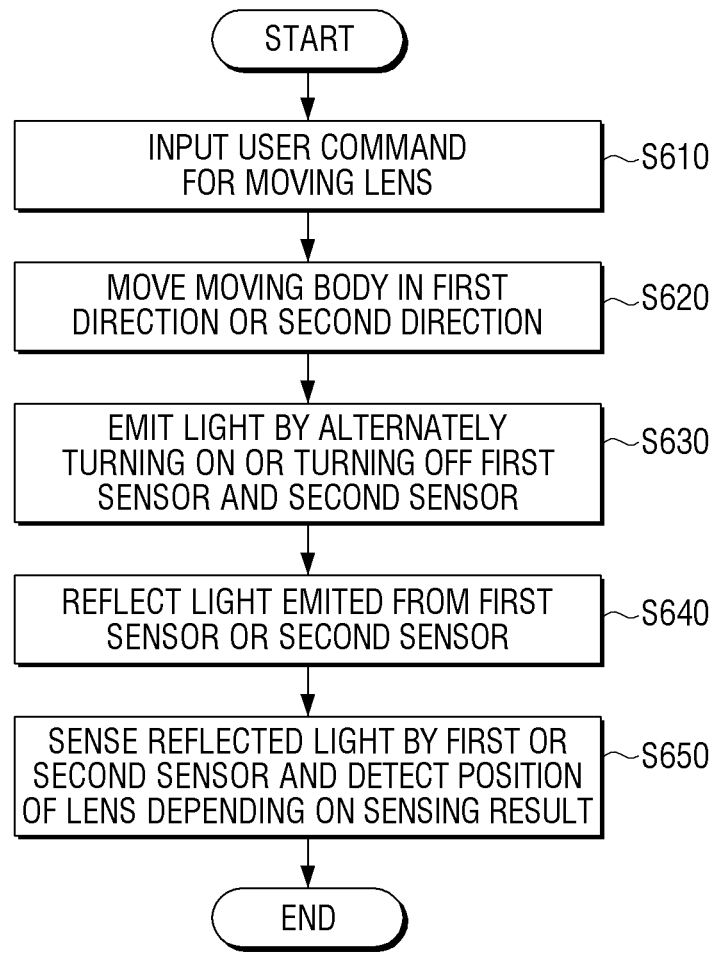

POSITION DETECTING APPARATUS AND METHOD FOR CONTROLLING THE SAME

CROSS-REFERENCE TO RELATED APPLICATION

This application claims priority under 35 U.S.C. §119(a) to Korean Patent Application No. 10-2012-0116895, filed on Oct. 19, 2012, in the Korean Intellectual Property Office, the disclosure of which is incorporated herein by reference.

BACKGROUND

1. Field

Various embodiments of the present disclosure relate to a position detecting apparatus and a method for controlling the same, and more particularly to a position detecting apparatus which can reduce power consumption through control of optical sensors for position detection and a method for controlling the same.

2. Related Art

In general, as a means for detecting a moving position of a moving body, a magneto resistive sensor (MR sensor) or a hall sensor is used. On the other hand, in order to save cost, an optical sensor may be used.

The optical sensor includes a light emitter and a light receiver. A method for sensing an object using the optical sensor is classified into a permeation type and a reflection type. The permeation type is a method for sensing an object that is positioned between the light emitter and the light receiver, which are arranged opposite of each other. The reflection type is a method for sensing an object in a manner that the light emitter and the light receiver are arranged on the same surface, where light emitted by the light emitter is reflected by the object, and the reflected light is sensed by the light receiver.

In order to detect the moving direction and the position of a moving body using the reflection type method, a plurality of optical sensors are required, and the light emitters should be turned on to detect the moving direction and the position. Accordingly, in the case where the plurality of light emitters is provided, the plurality of light emitters should be turned on, which causes high power consumption. Recently, with increasing concerns about reductions in power consumption and efficient use of energy, there is a need for a technique that can reduce the power consumption.

SUMMARY

The present disclosure has been made to address the above-described need. Accordingly, an embodiment of the present disclosure provides to a position detecting apparatus and a method for controlling the same, which can reduce power consumption of optical sensors for position detection.

According to one embodiment, a position detecting apparatus includes: a moving body having a lens mounted thereon; an input unit that receives an input command for moving the lens; a driver that moves the moving body in a first direction or a second direction according to the input command; a first sensor and a second sensor respectively mounted on the moving body; a displacement detection pattern unit having a plurality of reflecting bodies arranged thereon at predetermined intervals to reflect light emitted by the first sensor or the second sensor; and a controller that controls the first sensor and the second sensor to be alternately turned on to emit light, and if the light reflected by the displacement detection pattern unit is sensed by the first sensor or the second sensor, the controller detects a position of the lens based on sensing results, wherein the controller determines a period in which the first sensor is turned on and a period in which the second sensor is turned on based on an intersection point of a signal waveform sensed by the first sensor and a signal waveform sensed by the second sensor.

The controller may generate a first in-phase waveform using a quantity of light sensed by the first sensor and a second in-phase waveform using a quantity of light sensed by the second sensor based on movement of the moving body, and generate a first out-of-phase waveform having an opposite phase of the first in-phase waveform and a second out-of-phase waveform having an opposite phase of the second in-phase waveform.

The controller may detect a first period between an intersection point of the first in-phase waveform and the second in-phase waveform and an intersection point of the first in-phase waveform and the second out-of-phase waveform, a second period between an intersection point of the second in-phase waveform and the first out-of-phase waveform and an intersection point of the second in-phase waveform and the first in-phase waveform, a third period between an intersection point of the first out-of-phase waveform and the second out-of-phase waveform and an intersection point of the first out-of-phase waveform and the second in-phase waveform, and a fourth period between an intersection point of the second out-of-phase waveform and the first in-phase waveform and an intersection point of the second out-of-phase waveform and the first out-of-phase waveform. The controller may turn on only the first sensor in the first period and the third period, and turn on only the second sensor in the second period and the fourth period.

The controller may turn on both the first sensor and the second sensor in a predefined period about the intersection point, and alternately turn on the first sensor and the second sensor in a period other than the predefined period.

The controller may turn on both the first sensor and the second sensor for a predefined time from a point in time when the moving body starts to move, and alternately turn on the first sensor and the second sensor for a time other than the predefined time.

According to another embodiment, a method for controlling a position detecting apparatus including a moving body having a lens, a first sensor, and a second sensor mounted thereon, includes: receiving an input command for moving the lens; moving the moving body in a first direction or a second direction according to the input command; emitting light by alternately turning on the first sensor and the second sensor; and if the light emitted by the first sensor or the second sensor is reflected by a plurality of reflecting bodies arranged at predetermined intervals and the reflected light is sensed by the first or second sensor, detecting a position of the lens based on sensing results, wherein a period in which the first sensor is turned on and a period in which the second sensor is turned on are determined based on an intersection point of a signal waveform sensed by the first sensor and a signal waveform sensed by the second sensor.

The method for controlling a position detecting apparatus may further include: generating a first in-phase waveform using a quantity of light sensed by the first sensor and a second in-phase waveform using a quantity of light sensed by the second sensor based on movement of the moving body; and generating a first out-of-phase waveform having an opposite phase of the first in-phase waveform and a second out-of-phase waveform having an opposite phase of the second in-phase waveform.

The method for controlling a position detecting apparatus may further include: detecting a first period between an intersection point of the first in-phase waveform and the second in-phase waveform and an intersection point of the first in-phase waveform and the second out-of-phase waveform, a second period between an intersection point of the second in-phase waveform and the first out-of-phase waveform and an intersection point of the second in-phase waveform and the first in-phase waveform, a third period between an intersection point of the first out-of-phase waveform and the second out-of-phase waveform and an intersection point of the first out-of-phase waveform and the second in-phase waveform, and a fourth period between an intersection point of the second out-of-phase waveform and the first in-phase waveform and an intersection point of the second out-of-phase waveform and the first out-of-phase waveform, wherein the emitting of the light may include turning on only the first sensor in the first period and the third period, and turning on only the second sensor in the second period and the fourth period.

The emitting of the light may include turning on both the first sensor and the second sensor in a predefined period about the intersection point, and alternately turning on the first sensor and the second sensor in a period other than the predefined period.

The emitting of the light may turn on both the first sensor and the second sensor for a predefined time from a point in time when the moving body starts to move, and alternately turning on the first sensor and the second sensor for a time other than the predefined time.

According to the various embodiments of the present disclosure as described above, the power consumption of the position detecting apparatus can be reduced through reduction of the power consumption of the optical sensors.

BRIEF DESCRIPTION OF THE DRAWINGS

The above and other aspects, features and advantages of the present disclosure will become more apparent from the following detailed description when taken in conjunction with the accompanying drawings, in which:

FIG. 6 is a flowchart illustrating a method for controlling a position detecting apparatus, according to an embodiment.

DETAILED DESCRIPTION

Hereinafter, various embodiments of the present disclosure are described in detail with reference to the accompanying drawings. For reference, in the present disclosure, detailed descriptions of related functions or configurations known in the art may be omitted to avoid obscuring the subject matter of the present disclosure. Terminologies to be described later are defined in consideration of their functions in the present disclosure, and may differ depending on user's or operator's intentions or customs. Accordingly, they should be defined based on the contents of the overall description and claims.

Figure 1:
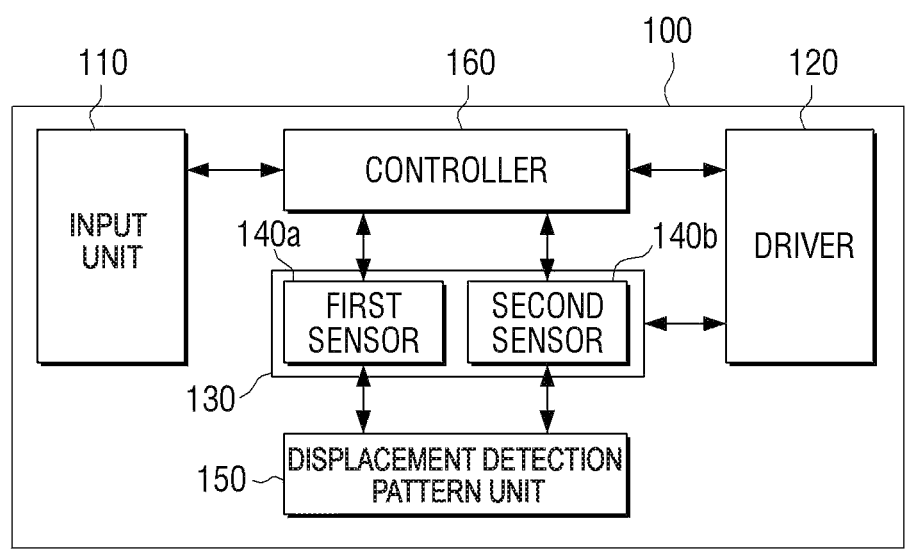
FIG. 1 is a block diagram of a position detecting apparatus, according to an embodiment.

FIG. 1 is a block diagram of a position detecting apparatus, according to an embodiment.

A position detecting apparatus 100 may be used to detect the moving direction and moving position of a lens in a camera. Hereinafter, an embodiment to detect information related to the movement of the lens of the camera will be described. However, the position detecting apparatus 100 is not used only to detect the lens movement information of the camera. For example, the position detecting apparatus 100 may be used to detect position information of a moving body in a measuring device or a robot. The position detecting apparatus 100 includes an input unit 110, a driver 120, a moving body 130, first and second sensors 140a and 140b, a displacement detection pattern unit 150, and a controller 160.

The input unit 110 receives an input of a user command for moving the moving body 130. The user command may be a command for directly moving the moving body 130 in a first direction or a second direction. If a user inputs a pre-stored command, the position detecting apparatus 100 may move the moving body 130 in accordance with the command. For example, if the user inputs an auto focusing (AF) command, the position detecting apparatus 100 may move the moving body 130 so that an image that is captured by the lens has the maximum resolution.

The driver 120 moves the moving body 130 in the first direction or the second direction. The first direction and the second direction may be directions opposite of each other on a straight line. That is, the driver 130 moves the moving body 130 forward and backward on the straight line.

The moving body 130 may have a lens mounted thereon. For example, first and second sensors 140a and 140b may be mounted on the moving body 130. As described above, the moving body 130 moves forward and backward on the straight line.

The first and second sensors 140a and 140b may include optical sensors. The first and second sensors 140a and 140b may include a light emitter and a light receiver. The light emitter and the light receiver are mounted in a line on the moving body 130. The optical sensor is of a reflection type, where if light emitted by the light emitter reaches and is reflected by an object, the light receiver senses the reflected light to recognize the object. A method for detecting information of the movement of the moving body 130 and the change of the reflected light depending on the movement of the moving body 130 will be described later.

The displacement detection pattern unit 150 has a plurality of reflecting bodies which are arranged thereon at predetermined intervals to reflect the light emitted by the first and second sensors 140a and 140b. The reflecting bodies are components that reflect a relatively larger amount of light, and the light reflection occurs even in regions between the reflecting bodies. For example, a reflecting body may be a mirror.

The controller 160 controls the first and second sensors 140a and 140b to turn on and off. For example, the controller 160 may turn on or off both the first and second sensors 140a and 140b. When the light reflected by the displacement detection pattern unit 150 is sensed by the first and second sensors 140a and 140b, the controller 160 may detect the position of the moving body 130 by analyzing the result of the sensing. Further, according to the result of the sensing, the controller 160 may alternately turn the first and second sensors 140a and 140b on or off. For example, the controller 130 may determine a time period in which the first sensor 140a is turned on and a time period in which the second sensor 140b is turned on based on an intersection point of signal waveforms sensed by the first and second sensors 140a and 140b. The details of a power control method will be described later. In the above-described example, since the lens is mounted on the moving body 130, the position of the detected moving body 130 becomes the position of the lens.

Next, the configuration of the position detecting apparatus 100, which has been described with reference to the block diagram of FIG. 1, will be described.

Figure 2:
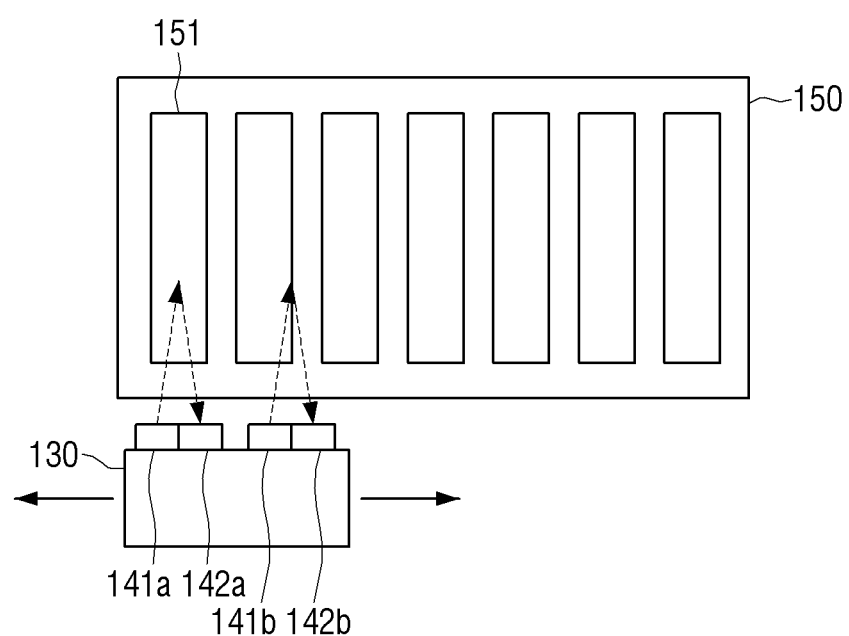
FIG. 2 is a diagram illustrating a configuration of a position detecting apparatus, according to an embodiment.

FIG. 2 is a diagram illustrating a configuration of a position detecting apparatus, according to an embodiment.

Referring to FIG. 2, the first and second sensors 140a and 140b are mounted on the moving body 130. The first sensor 140a includes a first light emitter 141a and a first light receiver 142a, and the second sensor 140b includes a second light emitter 141b and a second light receiver 142b. The first light emitter 141a, the first light receiver 142a, the second light emitter 141b, and the second light receiver 142b are mounted in order in a line. The first and second sensors 140a and 140b and the displacement detection pattern unit 150 are positioned in a relatively near distance. Accordingly, it is easy to detect the reflected light, and it is preferable that the first light emitter 141a and the first light receiver 142a are arranged near each other. It is also preferable that the second light emitter 141b and the second light receiver 142b are arranged near each other.

The moving body 130 moves in a straight line in parallel to the displacement detection pattern unit 150. The moving body 130 may be positioned on a rail that is connected to the displacement detection pattern unit 150. In this case, the moving body 130 may move in parallel to the displacement detection pattern unit 150 on the rail. The displacement detection pattern unit 150 includes a plurality of reflecting bodies 151. The displacement detection pattern unit 150 is a fixed component. As described above with reference to FIG. 1, the reflecting bodies 151 are components that reflect a relatively larger amount of light emitted by the first and second light emitters 141a and 41b, and the light reflection occurs even on other portions of the displacement detection pattern unit 150.

For example, if the moving body 130 moves, the first and second sensors 140a and 140b alternately face the reflecting bodies 151 and other portions of the displacement detection pattern unit 150. If the first and second light emitters 141a and 141b emit light, the first and second light receivers 142a and 142b sense the light that is reflected by the displacement detection pattern unit 150. That is, if the entire amount of light emitted by the first or second light emitter 141a or 141b is reflected by the reflecting body 151 and then sensed by the first or second light receiver 142a or 142b while the moving body 130 moves, the quantity of light that is sensed becomes maximum. If the entire amount of light emitted by the first or second light emitter 141a or 141b is reflected by the other portions of the displacement detection pattern unit 150 and then sensed by the first or second light receiver 142a or 142b, the quantity of light that is sensed becomes minimum. If half of the emitted light is reflected by the reflecting body 151 and the other half is reflected by the other portions of the displacement detection pattern unit 150 and then sensed, the quantity of light that is sensed becomes about a middle level. If the moving body 130 moves at constant speed, the quantities of light sensed by the first and second sensors 140a and 140b may be represented by waveforms similar to a sine curve.

The position of the lens can be detected using the generated waveforms, and the power supplied to the sensors for power saving can be controlled.

Figure 3:
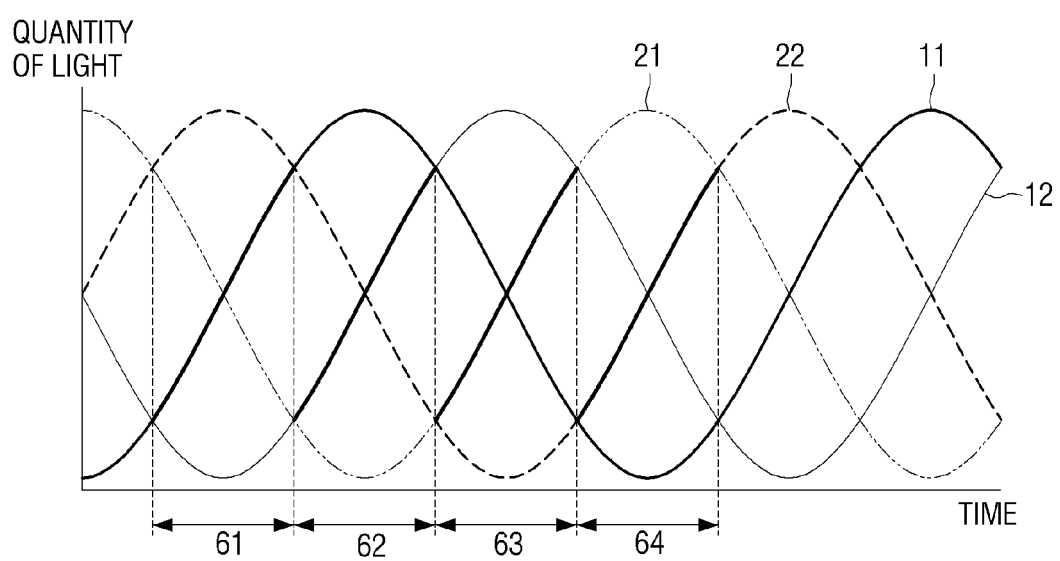
FIG. 3 is a diagram illustrating waveforms of optical sensors, according to an embodiment.

FIG. 3 is a diagram illustrating waveforms of optical sensors, according to an embodiment.

Referring to FIG. 3, four waveforms are illustrated. A first in-phase waveform 11 is sensed and generated by the first sensor 140a. A second in-phase waveform 12 is sensed and generated by the second sensor 140b. A first out-of-phase waveform 21 is a virtual waveform having an opposite phase of the first in-phase waveform 11 that is generated by the controller 160. A second out-of-phase waveform 22 is a virtual waveform having an opposite phase of the second in-phase waveform 12 that is generated by the controller 160. The first in-phase waveform 11 and the first out-of-phase waveform 21 have a phase difference of 180 degrees between them. In the same manner, the second in-phase waveform 12 and the second out-of-phase waveform 22 have a phase difference of 180 degrees between them. The first in-phase waveform 11, the second in-phase waveform 12, the first out-of-phase waveform 21, and the second out-of-phase waveform 22 may have a predetermined phase difference between them. For example, there may be a phase difference of 90 degrees between the respective waveforms.

A first period 61 is defined as a period between an intersection point of the first in-phase waveform 11 and the second in-phase waveform 12 and an intersection point of the first in-phase waveform 11 and the second out-of-phase waveform 22. A second period 62 is defined as a period between an intersection point of the second in-phase waveform 12 and the first out-of-phase waveform 21 and an intersection point of the second in-phase waveform 12 and the first in-phase waveform 11. A third period 63 is defined as a period between an intersection point of the first out-of-phase waveform 21 and the second out-of-phase waveform 22 and an intersection point of the first out-of-phase waveform 21 and the second in-phase waveform 12. A fourth period 64 is defined as a period between an intersection point of the second out-of-phase waveform 22 and the first in-phase waveform 11 and an intersection point of the second out-of-phase waveform 22 and the first out-of-phase waveform 21.

The position of the moving body 130 may be detected using the first in-phase waveform 11 in the first period 61, the second in-phase waveform 12 in the second period 62, the first out-of-phase waveform 21 in the third period 63, and the second out-of-phase waveform 22 in the fourth period 64.

If the moving body 130 moves while the first and second sensors 140a and 140b emit light, the first and second sensors 140a and 140b sense the light reflected by the displacement detection pattern unit 150. The controller 160 may generate the first in-phase waveform 11 and the second in-phase waveform 12 from the result of the sensing. Since the first sensor 140a and the second sensor 140b are arranged in different positions, the waveforms at a point in time when the moving body 130 moves have different phases. For example, if the moving body moves in a first direction, the first in-phase waveform 11 first rises, and the second in-phase waveform 12 rises with a predetermined phase difference. Accordingly, if the first in-phase waveform 11 first rises, the controller 160 can sense that the moving body 130 moves in the first direction. By contrast, if the moving body 130 moves in a second direction, the second in-phase waveform 12 first rises, and the first in-phase waveform 11 rises with the predetermined phase difference. Accordingly, if the second in-phase waveform 12 first rises, the controller 160 can sense that the moving body 130 moves in the second direction. In order to detect the position and the direction of the moving body 130, the size and the intervals of the reflecting bodies 151 of the displacement detection pattern unit 150 may be appropriately adjusted. The interval of the first and second sensors 140a and 140b mounted on the moving body 130 may also be appropriately adjusted. Further, information on an initial position is stored, and if a user command is terminated, the moving body 130 may automatically move to the initial position.

As described above, in order to detect the position, only information of one sensor is used in the respective periods 61, 62, 63, and 64. Accordingly, a sensor not in use may be turned off. For example, an unused sensor may be turned off. For example, in the first period 61, information of the first in-phase waveform 11 is used. Accordingly, only the first sensor 140a may be turned on. In the second period 62, information of the second in-phase waveform 12 is used. Accordingly, only the second sensor 140b may be turned on. In the third period 63, information of the first out-of-phase waveform 21 is used. The first out-of-phase waveform 21 is generated from the first in-phase waveform 11. Accordingly, only the first sensor 140a may be turned on. In the fourth period 64, information of the second out-of-phase waveform 22 is used. The second out-of-phase waveform 22 is generated from the second in-phase waveform 12. Accordingly, only the second sensor 140a may be turned on.

In each period, only one sensor may be turned on. However, for stability of direction determination and position detection, the controller 160 may turn on both the first and second sensors 140a and 140b for a predefined time from a point in time when the moving body 130 starts the movement or from a point in time when the direction is changed. For example, the predefined time may be defined as an absolute time such as 0.1 sec. Further, the predefined time may be defined as a relative time such as a time that corresponds to one of the first to fourth periods 61, 62, 63, and 64. The time when both the first and second sensors 140a and 140b are turned on may be set in consideration of the characteristic or performance of the position detecting apparatus 100 or the system.

Figure 4:
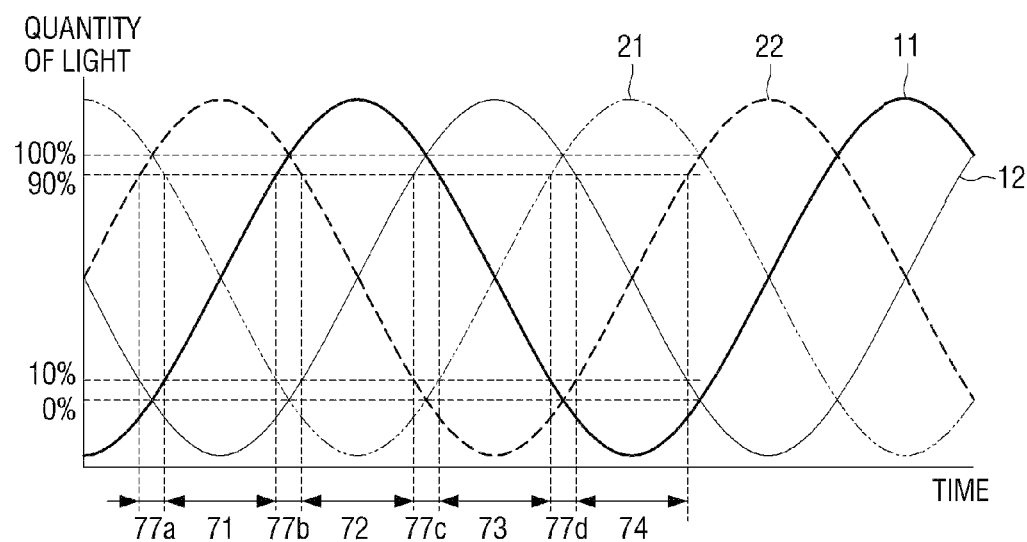
FIG. 4 is a diagram of waveforms and FIG. 5 is a flow chart illustrating turn-on operations of optical sensors, according to an embodiment.
Figure 5:
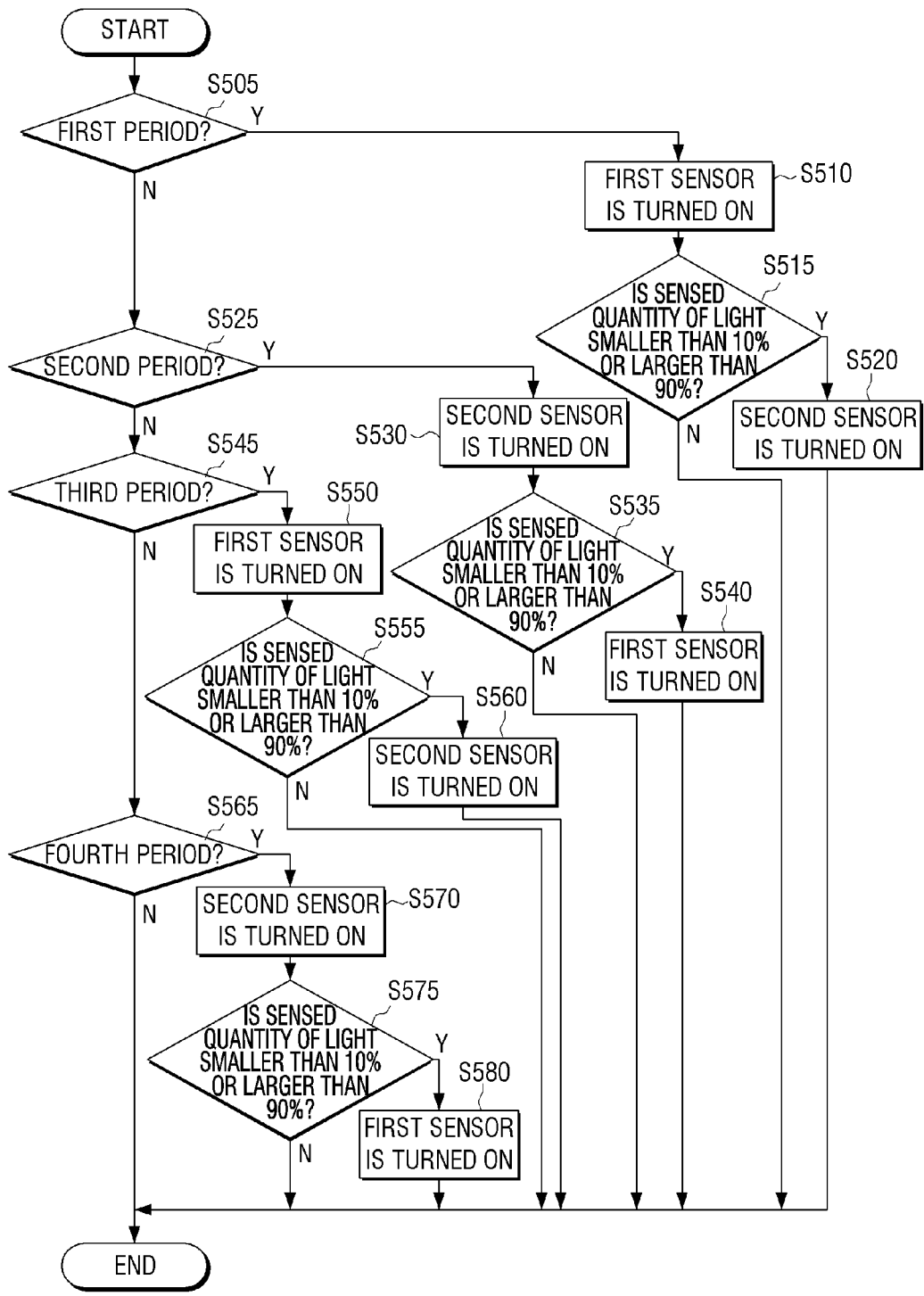

FIG. 4 is a diagram of waveforms and FIG. 5 is a flowchart illustrating turn-on operations of sensors, according to an embodiment. Even while the moving body 130 moves in the first direction or the second direction, the period in which both the first and second sensors 140a and 140b are turned on may be set.

Referring to FIG. 4, fifth to eighth periods 71, 72, 73, and 74 that correspond to the first to fourth periods 61, 62, 63, and 64 illustrated in FIG. 3 are illustrated. In FIG. 3, the boundaries of the periods are set based on the points where respective waveforms cross each other. However, in FIG. 4, a predetermined range in which intersection points have the minimum value or the maximum value is set as one period. For example, the fifth period 71 may be set as follows. The quantity of light at a point where the first in-phase waveform 11 crosses the second in-phase waveform 12 is defined as the minimum value (0%), and the quantity of light at a point where the first in-phase waveform 11 crosses the second out-of-phase waveform 22 is defined as the maximum value (100%). The fifth period 71 may be set as a period in which the quantity of light of the first in-phase waveform 11 is 10% to 90%.

In the same manner, in the sixth period 72, the quantity of light at a point where the second in-phase waveform 12 crosses the first out-of-phase waveform 21 is defined as the minimum value (0%), and the quantity of light at a point where the second in-phase waveform 12 crosses the first in-phase waveform 11 is defined as the maximum value (100%). The sixth period 72 may be set as a period in which the quantity of light of the second in-phase waveform 12 is 10% to 90%. In the seventh period 73, the quantity of light at a point where the first out-of-phase waveform 21 crosses the second out-of-phase waveform 22 is defined as the minimum value (0%), and the quantity of light at a point where the first out-of-phase waveform 21 crosses the second in-phase waveform 12 is defined as the maximum value (100%). The seventh period 73 may be set as a period in which the quantity of light of the first out-of-phase waveform 21 is 10% to 90%. In the eighth period 74, the quantity of light at a point where the second out-of-phase waveform 22 crosses the first in-phase waveform 11 is defined as the minimum value (0%), and the quantity of light at a point where the second out-of-phase waveform 22 crosses the first out-of-phase waveform 21 is defined as the maximum value (100%). The eighth period 74 may be set as a period in which the quantity of light of the second out-of-phase waveform 22 is 10% to 90%.

In a similar manner as described with reference to FIG. 3, in the fifth period 71 and the seventh period 73, only the first sensor 140a may be turned on, and in the sixth period 73 and the eighth period 74, only the second sensor 140b may be turned on. In buffering periods 77a, 77b, 77c, and 77d between the fifth to eighth periods 71, 72, 73, and 74, both the first and second sensors 140a and 140b may be turned on.

The boundary points in the fifth to eighth periods 71, 72, 73, and 74 as shown in FIG. 4, where the quantity of light becomes 10% or 90% of the quantity of light at the intersection point, are merely exemplary, and can be variously set depending on the performance of the system, the speed of the moving body 130, the performance of the position detecting apparatus 100. For example, in the case of the moving body 130 that moves at high speed, one period may be set with the points where the quantity of light becomes 20% and 80% as the boundaries. Further, the period in which the quantity of light becomes 10% to 90% or the period in which the quantity of light becomes 20% to 80% based on the maximum quantity of light (100%) and the minimum quantity of light (0%) that are sensed by the first and second sensors 140a and 140b may be set as one period.

As another example, since the maximum quantity of light, the minimum quantity of light, and the quantity of light at the intersection point, which are sensed by the first and second sensors 140a and 140b may be measured in advance, the respective periods may be set as absolute values. For example, if the maximum quantity of light sensed by the sensor is 1100, the minimum quantity of light is 100, and the quantities of light of two intersection points are 400 and 800, the respective periods may be set as the periods in the light quantity range of 400 to 800. Further, the respective periods may be set as the periods in which the quantity of light becomes 10% to 90%, that is, as the periods in which the quantity of light becomes 440 to 760, based on the quantity of light between two intersection points. The reference point for setting the periods as described above may be the sensed maximum quantity of light and minimum quantity of light rather than the quantity of light at the intersection point.

FIG. 5 is a flowchart illustrating turn-on operations of sensors, according to an embodiment.

Referring to FIG. 5, the controller 160 determines whether the period is the first period 61 (S505). The first period 61 is a period between the intersection point of the first in-phase waveform 11 and the second in-phase waveform 12 and the intersection point of the first in-phase waveform 11 and the second out-of-phase waveform 22. If it is determined that the period is the first period 61 (Y), the first sensor 140a is turned on (S510). It is then determined whether the sensed quantity of light is smaller than 10% or larger than 90% (S515). That is, it is determined whether the period is the buffering period. As described above, the boundary reference of the period may be variously set. If it is determined that the period is the buffering period (Y), the second sensor 140b is turned on (S520).

If the controller 160 determines that the period is not the first period 61 (N of S505), the controller 160 then determines whether the period is the second period 62 (S525). The second period 62 is a period between the intersection point of the second in-phase waveform 12 and the first out-of-phase waveform 21 and the intersection point of the second in-phase waveform 12 and the first in-phase waveform 11. If it is determined that the period is the second period 62 (Y), the second sensor 140*b* is turned on (S530). It is then determined whether the sensed quantity of light is smaller than 10% or larger than 90% (S535). That is, it is determined whether the period is the buffering period. If it is determined that the period is the buffering period (Y), the first sensor 140*a* is turned on (S540).

If the controller 160 determines that the period is not the second period 62 (N of S525), the controller 160 then determines whether the period is the third period 63 (S545). The third period 63 is a period between the intersection point of the first out-of-phase waveform 21 and the second out-of-phase waveform 22 and the intersection point of the first out-of-phase waveform 21 and the second in-phase waveform 12. If it is determined that the period is the third period 63 (Y), the first sensor 140*a* is turned on (S550). It is then determined whether the sensed quantity of light is smaller than 10% or larger than 90% (S555). That is, it is determined whether the period is the buffering period. If it is determined that the period is the buffering period (Y), the second sensor 140*b* is turned on (S560).

If the controller 160 determines that the period is not the third period 63 (N of S545), the controller 160 then determines whether the period is the fourth period 64 (S565). The fourth period 64 is a period between the intersection point of the second out-of-phase waveform 22 and the first in-phase waveform 11 and the intersection point of the second out-of-phase waveform 22 and the first out-of-phase waveform 21. If it is determined that the period is the fourth period 64 (Y), the second sensor 140*b* is turned on (S570). It is then determined whether the sensed quantity of light is smaller than 10% or larger than 90% (S575). That is, it is determined whether the period is the buffering period. If it is determined that the period is the buffering period (Y), the first sensor 140*a* is turned on (S580).

Up to now, various embodiments of the present disclosure have been described. Hereinafter, a method for controlling a power supply to the sensors, which is performed by the position detecting apparatus, will be described.

FIG. 6 is a flowchart illustrating a method for controlling a position detecting apparatus, according to an embodiment.

Referring to FIG. 6, the position detecting apparatus receives an input of a user command for moving the lens (S610). The lens is mounted on the moving body, and the user command may be a command for directly moving the moving body in the first direction or the second direction. Further, if a user inputs a pre-stored command, the position detecting apparatus may move the moving body in accordance with the command. The position detecting apparatus moves the moving body in the first direction or the second direction (S620). The position detecting apparatus emits light by alternately turning on or off the first sensor and the second sensor (S630). Reflecting bodies then reflect the light emitted by the first sensor or the second sensor (S640). Since the method for alternately turning on or off the sensors has been described, the duplicate description thereof will be omitted. The reflected light is sensed by the first or second sensor, and the position of the lens is detected depending on the result of the sensing (S650). The first and second sensors and the lens are mounted on the moving body. Accordingly, the position detected depending on the result of the sensing may be the position of the first and second sensors, the position of the moving body, or the position of the lens.

The method for controlling the position detecting apparatus according to the above-described various embodiments may be implemented by a program and be provided to a display device.

As an example, a non-transitory computer readable medium may be provided, which stores a program to perform a method of receiving an input of the user command for moving the lens, moving the moving body in the first direction or the second direction according to the user command, emitting light by alternately turning on or off the first sensor and the second sensor, and sensing the reflected light through the first or second sensor and detecting the position of the lens depending on the result of the sensing, wherein the period in which the first sensor is turned on and the period in which the second sensor is turned on are determined on the basis of the intersection point between the signal waveform sensed by the first sensor and the signal waveform sensed by the second sensor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A position detecting apparatus comprising:
a moving body having a lens mounted thereon;
an input unit that receives an input command for moving the lens;
a driver that moves the moving body in a first direction or a second direction according to the input command;
a first sensor and a second sensor respectively mounted on the moving body;
a displacement detection pattern unit having a plurality of reflecting bodies arranged thereon at predetermined intervals to reflect light emitted by the first sensor or the second sensor; and
a controller that determines turn-on periods of the first and the second sensors based on an intersection point of signal waveforms sensed by the first and the second sensors, controls the first and the second sensors to be alternately turned on based on the determined turn-on periods to emit the light, and in response to a light reflected by the displacement detection pattern unit being sensed by the first or the second sensors, detects a position of the lens based on the sensing results.

2. The position detecting apparatus as claimed in claim 1, wherein the controller generates a first in-phase waveform using a quantity of light sensed by the first sensor and a second in-phase waveform using a quantity of light sensed by the second sensor based on movement of the moving body, and
generates a first out-of-phase waveform having an opposite phase of the first in-phase waveform and a second out-of-phase waveform having an opposite phase of the second in-phase waveform.

3. The position detecting apparatus as claimed in claim 2, wherein the controller detects a first period between an intersection point of the first in-phase waveform and the second in-phase waveform and an intersection point of the first in-phase waveform and the second out-of-phase waveform, a second period between an intersection point of the second in-phase waveform and the first out-of-phase waveform and an intersection point of the second in-phase waveform and the first in-phase waveform, a third period between an intersection point of the first out-of-phase waveform and the second out-of-phase waveform and an intersection point of the first out-of-phase waveform and the second in-phase waveform, and a fourth period between an intersection point of the second out-of-phase waveform and the first in-phase waveform and an intersection point of the second out-of-phase waveform and the first out-of-phase waveform, and
turns on only the first sensor in the first period and the third period, and turns on only the second sensor in the second period and the fourth period.

4. The position detecting apparatus as claimed in claim 1, wherein the controller turns on both the first sensor and the second sensor in a predefined period about the intersection point, and alternately turns on the first sensor and the second sensor in a period other than the predefined period.

5. The position detecting apparatus as claimed in claim 1, wherein the controller turns on both the first sensor and the second sensor for a predefined time from a point in time when the moving body starts to move, and alternately turns on the first sensor and the second sensor for a time other than the predefined time.

6. A method for controlling a position detecting apparatus including a moving body having a lens, a first sensor, and a second sensor mounted thereon, comprising:

receiving an input command for moving the lens;

moving the moving body in a first direction or a second direction according to the input command;

emitting light by alternately turning on the first sensor and the second sensor; and if the light emitted by the first sensor or the second sensor is reflected by a plurality of reflecting bodies arranged at predetermined intervals and the reflected light is sensed by the first sensor or the second sensor, detecting a position of the lens based on sensing results, wherein a period in which the first sensor is turned on and a period in which the second sensor is turned on are determined based on an intersection point of a signal waveform sensed by the first sensor and a signal waveform sensed by the second sensor.

7. The method for controlling a position detecting apparatus as claimed in claim 6, further comprising:

generating a first in-phase waveform using a quantity of light sensed by the first sensor and a second in-phase waveform using a quantity of light sensed by the second sensor based on movement of the moving body; and generating a first out-of-phase waveform having an opposite phase of the first in-phase waveform and a second out-of-phase waveform having an opposite phase of the second in-phase waveform.

8. The method for controlling a position detecting apparatus as claimed in claim 7, further comprising:

detecting a first period between an intersection point of the first in-phase waveform and the second in-phase waveform and an intersection point of the first in-phase waveform and the second out-of-phase waveform, a second period between an intersection point of the second in-phase waveform and the first out-of-phase waveform and an intersection point of the second in-phase waveform and the first in-phase waveform, a third period between an intersection point of the first out-of-phase waveform and the second out-of-phase waveform and an intersection point of the first out-of-phase waveform and the second in-phase waveform, and a fourth period between an intersection point of the second out-of-phase waveform and the first in-phase waveform and an intersection point of the second out-of-phase waveform and the first out-of-phase waveform, wherein the emitting of the light comprises turning on only the first sensor in the first period and the third period, and turning on only the second sensor in the second period and the fourth period.

9. The method for controlling a position detecting apparatus as claimed in claim 6, wherein the emitting of the light comprises turning on both the first sensor and the second sensor in a predefined period about the intersection point, and alternately turning on the first sensor and the second sensor in a period other than the predefined period.

10. The method for controlling a position detecting apparatus as claimed in claim 6, wherein the emitting of the light comprises turning on both the first sensor and the second sensor for a predefined time from a point in time when the moving body starts to move, and alternately turning on the first sensor and the second sensor for a time other than the predefined time.

\* \* \* \* \*